United States Patent
Baccelli et al.

(10) Patent No.: US 7,363,005 B2
(45) Date of Patent: Apr. 22, 2008

(54) LOAD CONTROL SCHEME AND PROCESS WITH POWER CONTROL

(75) Inventors: François Baccelli, Meudon (FR); Bartlomiej Blaszczyszyn, Bagneux (FR); Mohamed Kadhem Karray, Issy les Moulineaux (FR)

(73) Assignees: France Telecom, Paris (FR); Inria Institut National de Recherche en Informatique Et En Automatique, Le Chesnay (FR)

( * ) Notice: Subject to any disclaimer, the term of this patent is extended or adjusted under 35 U.S.C. 154(b) by 280 days.

(21) Appl. No.: 10/825,691

(22) Filed: Apr. 16, 2004

(65) Prior Publication Data
US 2004/0224640 A1 Nov. 11, 2004

(30) Foreign Application Priority Data
Apr. 30, 2003 (FR) .................... 03 05354

(51) Int. Cl.
H04B 7/00 (2006.01)
H04Q 7/20 (2006.01)
(52) U.S. Cl. ........................ 455/39; 455/522
(58) Field of Classification Search ............... 455/453, 455/522, 67.11, 68–69
See application file for complete search history.

(56) References Cited

U.S. PATENT DOCUMENTS

| | | | | |
|---|---|---|---|---|
| 5,912,884 | A * | 6/1999 | Park et al. ............ | 370/331 |
| 6,072,778 | A * | 6/2000 | Labedz et al. .......... | 370/252 |
| 6,118,983 | A * | 9/2000 | Egusa et al. ........... | 455/69 |
| 6,259,927 | B1 * | 7/2001 | Butovitsch et al. ...... | 455/522 |
| 6,501,959 | B1 * | 12/2002 | Seon ................... | 455/522 |
| 6,678,531 | B1 * | 1/2004 | Salonaho .............. | 455/522 |
| 6,690,939 | B1 * | 2/2004 | Jonsson et al. ......... | 455/453 |
| 6,970,716 | B2 * | 11/2005 | Rune et al. ............ | 455/552.1 |
| 2001/0053670 | A1 * | 12/2001 | Voyer ................... | 455/69 |

(Continued)

FOREIGN PATENT DOCUMENTS

EP 1 028 543 A1 8/2000

(Continued)

OTHER PUBLICATIONS

Zander, "Performance of Optimum Transmitter Power Control in Cellular Radio Systems," IEEE Transactions on Vehicular Technology, vol. 41, No. 1, 1992, pp. 57-62.

(Continued)

Primary Examiner—Simon Nguyen
(74) Attorney, Agent, or Firm—Foley & Lardner LLP

(57) ABSTRACT

The invention discloses a control scheme for wireless communications networks, including stations communicating with mobiles in downlink mode. The network includes an elementary load calculator designed to compute the load induced by a given mobile on a server station. The elementary load calculator includes:

a first function (PA1) designed to compute a first elementary quantity taking into account the attenuation between the mobile and each nearby station ($L_{v,m_u}$) and the limit on the total power emitted by each nearby station, a second function (PA2) designed to compute a second elementary quantity taking into account the requirements of the mobile vis-a-vis its station ($\xi_{m_u}'$) and the attenuation between the mobile and its station ($L_{u,m_u}$), the elementary load calculator being capable of computing the product of the first elementary quantity by the second elementary quantity, which gives an elementary product representing the load induced by the mobile ($EDPAP_{m_u}$).

39 Claims, 9 Drawing Sheets

U.S. PATENT DOCUMENTS

| | | | |
|---|---|---|---|
| 2002/0077113 A1* | 6/2002 | Spaling et al. | 455/453 |
| 2002/0098847 A1 | 7/2002 | Benveniste | |
| 2002/0107021 A1* | 8/2002 | Ishikawa et al. | 455/436 |
| 2002/0155854 A1* | 10/2002 | Vanghi | 455/522 |
| 2002/0177462 A1* | 11/2002 | Cao et al. | 455/522 |
| 2003/0003921 A1* | 1/2003 | Laakso | 455/453 |
| 2004/0203397 A1* | 10/2004 | Yoon et al. | 455/63.1 |
| 2004/0235510 A1* | 11/2004 | Elicegui et al. | 455/522 |
| 2005/0107106 A1* | 5/2005 | Valkealahti et al. | 455/522 |

FOREIGN PATENT DOCUMENTS

| | | |
|---|---|---|
| FR | 2 827 098 A1 | 1/2003 |
| FR | 2 828 621 A1 | 2/2003 |

OTHER PUBLICATIONS

Knutsson et al., "Downlink Admission Control Strategies for COMA Systems In A Manhattan Environment," IEEE Vehicular Technology Conference, 1998, pp. 1453-1457.

\* cited by examiner

LOAD CONTROL SCHEME AND PROCESS WITH POWER CONTROL

BACKGROUND OF THE INVENTION

The invention relates to wireless communications networks.

Wireless communications networks include base stations linked to mobiles. Upon request from a mobile, a base station is able to establish communication with that mobile. This communication facilitates an exchange of speech or digital data between users.

Such communication can be effected by means of a "downlink", in which case the communication is established from the base station to the mobile. The expression "downlink" or "down channel" refers to the case where the base station seeks to establish or maintain communication to the mobile.

In a wireless communications network, the base stations provide services to the mobiles. A mobile requests a certain service which is composed of data to be transmitted under certain conditions (for example data rate or timing). An "active" mobile is a mobile that is receiving such a service.

The mobile may request two types of services, namely real time services with predefined data rates and deferred services with flexible data rates.

Normal operation of a wireless communications network relies on load control. Load control facilitates the management of access (also termed "admission control") of a mobile to a given base station, together with management of the load of a given base station (also termed "congestion control") to ensure quality of service (QoS). More precisely, admission control serves to determine for a given base station whether a new mobile can be served by the base station, while congestion control serves to control the load induced by all of the mobiles served by the base station (referred to as "active" mobiles).

The document "*Downlink admission control strategies for cdma systems in a manhattan environment*. Vehicular Technology Conference, 2:1453-1457, 1998" by M. Persson, J. Knutsson, P. Butovitsch and R. D. Yates, describes so-called "direct load control" schemes.

In "direct load control" schemes, load control is based on a comparison between a load indicator computed for a given base station and a threshold value referred to as the load threshold. In these configurations, admission control allows access by a new mobile to a given base station if it can be served without pushing the load indicator beyond the load threshold. In downlink communications networks, such a load indicator generally depends on the transmission power of the base station which fluctuates over time. The load threshold must therefore be specified with a large safety margin. Moreover, the additional load induced by a new mobile is estimated in an approximate manner. Also, in such direct load control schemes, communication outages can occur, even instantaneously following the admission of a new mobile and access to a base station may be denied to more mobiles than necessary.

The document "*Soft and safe admission control in cellular networks*. IEEE Transaction on Networking, 5(2):414-418, April 1997" by Zvi Rosberg, Michael Andersin and Jens Zander, and the document "*Channel access algorithms with active link protection for wireless communication networks with power control*, IEEE/ACM Transactions in Networking, 8(5):583-596, October 2000" by N. Bambos, S. C. Chen and G. J. Pottie, describe other arrangements referred to as "test load control" schemes.

In "test load control" schemes, admission control temporarily allows a new user access to a base station until a decision is taken. Test load controls have the advantage of ensuring that no cutoff will occur, at least at the time when the decision is taken, but have the drawback of being excessively long, so that they are rarely usable in practice.

French patent application No. 03 02 017 proposes a load control process and scheme based on a comparison between a load indicator computed for a given base station, and a threshold value, termed the load threshold, as in direct load control schemes.

In patent application No. 03 02 017, the load indicator depends only on the attenuations between the users and the antennas, and on the signal-to-interference-and-noise ratios (SINR). Thus, they do not depend on the transmission powers. However, in the process and scheme described in this patent application, load control is exercised without taking power limitations into account. Such power limitations are generally imposed by a standard which fixes the maximum power that a base station is allowed to emit.

SUMMARY OF THE INVENTION

The invention is an improvement on this situation.

To this end, the invention discloses a control process for a wireless communications system, the network being composed of stations communicating with mobiles by downlink. Advantageously, for a given mobile associated with a server station, the network includes:

i) computation of a first elementary quantity allowing for the attenuation between the mobile and each nearby station and the limit on the total power emitted by each nearby station, and ii) the product of the first elementary quantity and a second elementary quantity taking into account the requirements of the mobile vis-a-vis its station and the attenuation between the mobile and the station.

According to one aspect of the invention, for a predefined set of mobiles including mobiles served by the said server station, the process also includes:

a) application of steps i) and ii) to each mobile in the set, which gives the elementary products, b) summation of the elementary products obtained at step a), and c) comparison of a sum resulting from step b) to a load threshold relative to the limit on total power emitted by the server station.

For a given nearby station, step i) includes:

i01) division of the limit on the total power emitted by said nearby station by the attenuation of the mobile vis-a-vis the nearby station, and i02) multiplication of the value obtained at step i01) by the orthogonality factor between the server station and said nearby station.

Step i) also includes:

i0) application of steps i01) and i02) to each nearby station, i1) summation of the values obtained at step i0), i2) addition of external noise to the value obtained at step i1), which gives said first elementary quantity for said given mobile.

According to another aspect of the invention, step c) includes computation of the difference between the limit on total power emitted by the server antenna and the common channel power, which gives the load threshold.

In particular, step c) is applied to the value resulting from the summation at step b).

If the comparison of step c) indicates that the sum is greater than the load threshold, the process can then include:
d) reduction of the number of mobiles in the predefined set of mobiles,
e) iteration of steps a) to c) applied to the reduced set obtained at step d).

In a particular embodiment, the mobiles have a fixed data rate demand, while the summation of elementary products at step b) is effected step by step in a specified order and includes for a given initial value:
b1) addition of an elementary product, associated with a given mobile in the predefined set, to said initial value, which gives a running sum,
b2) iteration of step e) applied to the running sum.

If the comparison at step b2) indicates that the running sum is less than or equal to the load threshold, step b) also includes an iteration of steps b1) and b2) for the next elementary product, in the specified order, with an initial value taken as equal to the running sum obtained at the preceding step b1).

If the comparison at step b2) indicates that the running sum is greater than the load threshold, step b) also includes an interruption of the summation and a denial of access to the server station for the mobile associated with the last elementary product added and for the mobiles associated with the next elementary products, in the specified order.

According to this embodiment, the summation of elementary products can be effected in ascending order of elementary products.

Summation of the elementary products can also be effected in random order of the elementary products.

As a variant, the summation of elementary products can be accomplished in an order determined as a function of predefined priorities between the associated mobiles.

According to an aspect of this embodiment, the initial value is null at the first iteration in step b1).

According to another embodiment, the mobiles have a fixed data rate demand and the process also includes an access control to the server station for a "candidate" mobile.

In this case, the predefined set of mobiles additionally includes the "candidate" mobile.

As a variant, step b) can include storage of the value resulting from the summation.

The access control then includes:
j1) an iteration of steps i) and ii) for said candidate mobile, which provides an elementary product associated with the candidate mobile,
j2) addition of this elementary product to the stored sum, and
j3) iteration of step c) applied to the sum obtained at step j2).

The access control includes authorisation of access to the server station for the candidate mobile if the comparison at step c) indicates that the sum is below or equal to the load threshold.

The access control includes denial of access to the server station by the candidate mobile if the comparison at step c) indicates that the sum is above said load threshold.

According to an additional aspect of the invention, step ii) includes computation of a quantity representing the requirements of the mobile vis-a-vis its station from a threshold of the signal-to-interference-and-noise ratio and the orthogonality factor between the channels of the server station.

Step ii) then includes multiplication of the quantity representing the requirements of the mobile vis-a-vis its station by the attenuation between the mobile and its station, which provides the second elementary quantity.

The signal-to-interference-and-noise ratio can be calculated from the bit rate assigned to the mobile.

According to another embodiment of the invention, the mobiles have a variable rate demand and step i) initially includes:
i'01) computation of the signal-to-interference-and-noise ratio as a function of an initial bit rate value,
i'02) computation of the quantity representing the requirements of the mobile as a function of the signal-to-interference-and-noise ratio threshold obtained at step i'01).

If the comparison at step c) indicates that the sum is above the load threshold, the process additionally includes a modification of the initial bit rate value and an iteration of steps a) to c) for the new initial rate value.

The invention also discloses a control scheme for wireless communications networks, including stations communicating with mobiles by downlink, the network incorporating an elementary load calculator designed to compute the load induced by a given mobile on a server station. Advantageously, the elementary load calculator includes:
a first function designed to compute a first elementary quantity taking into account the attenuation between the mobile and each nearby station and the limit on the total power emitted by each nearby station,
a second function designed to compute a second elementary quantity taking into account the requirements of the mobile vis-a-vis its station and the attenuation between the mobile and its station, the elementary load calculator being capable of computing the product of the first elementary quantity by the second elementary quantity, which provides an elementary product representing the load induced by the mobile.

According to an aspect of the invention, the system is also capable of computing respective elementary products for a predefined set of mobiles associated with a given server station.

The system also includes a summation function interacting with the elementary load calculator, the summation function being designed to summate the elementary products computed by the elementary load calculator, which provides a load indicator relative to the server station.

The system also includes a comparator interacting with the summation function, the comparator being capable of comparing the load indicator computed by the summation function for a given server station with a load threshold relative to the limit on the total power emitted by the server station.

The threshold calculator is designed to compute the difference between the limit on total power emitted by the server station and the common channel power of the server station, which gives said load threshold.

The first function is capable of dividing the limit on total power emitted by a given nearby station by the attenuation of the mobile vis-a-vis the nearby station, and multiplying the value resulting from the division by the orthogonality factor between the server station and the nearby station, which gives an intermediate quantity.

The first function is then capable of computing the value of the intermediate quantity for each nearby station, summating the values of the intermediate quantities thus obtained, and adding the external noise to the resulting value of the summation, which gives the first elementary quantity for the given mobile.

In addition, the scheme includes a load reduction function designed to reduce the number of mobiles in the predefined set of mobiles if the comparator indicates that the load indicator is above the load threshold.

According to an embodiment of the invention, the mobiles have a fixed data rate demand and the system additionally includes an access controller to control the access of a candidate mobile to a server station as a function of the result returned by the comparator.

The predefined set of mobiles then also includes the "candidate" mobile.

The access controller is capable of authorising access to the server station for the candidate mobile if the result returned by the comparator indicates that the load indicator is below or equal to the load threshold.

The access controller is capable of denying access to the server station for the candidate mobile if the result returned by the comparator indicates that the load indicator is above the load threshold.

According to another aspect of the invention, the second function is capable of computing a quantity representing the requirements of the mobile vis-a-vis its server station from the threshold of the signal-to-interference-and-noise ratio and the orthogonality factor between the channels of the server station.

The second function is capable of multiplying the quantity representing the requirements of the mobile vis-a-vis its server station by the attenuation between the mobile and its station, which gives the second elementary quantity.

The threshold of the signal-to-interference-and-noise ratio is computed on the basis of the bit rate assigned to the mobile.

According to another embodiment of the invention, the mobiles have a variable rate demand and the system includes a load regulator. The regulator is capable of modifying the bit rate value assigned to the mobiles if the result returned by the comparator indicates that the load indicator is below or equal to the load threshold.

BRIEF DESCRIPTION OF THE DRAWINGS

Other features and advantages of the invention will become apparent upon reading the following detailed description together with the attached drawings in which.

DESCRIPTION OF THE PREFERRED EMBODIMENTS

Annex 1 gives the mathematical formulae used in the embodiments of the invention.

The diagrams and annex essentially contain elements that are certain in character. They can therefore be used not only as a means of better understanding the description, but can also contribute to the definition of the invention, as the case may be.

Figure 1A:
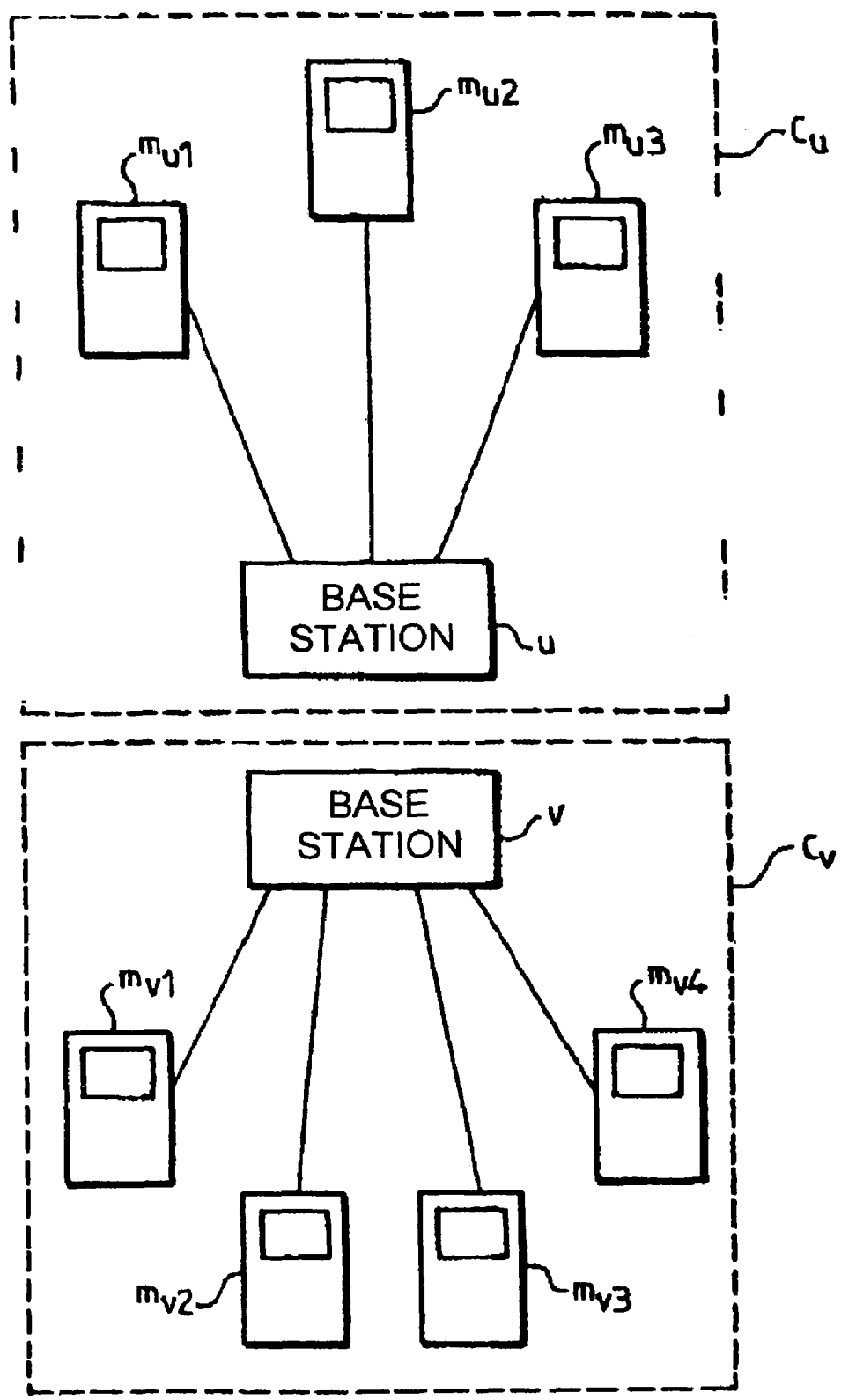
FIGS. 1a and 1b illustrate the cells of a wireless communication network.

FIG. 1a illustrates a wireless communications network or cellular network including two base stations u and v. A base station, which for brevity may be termed "station" or "antenna", incorporates a network antenna which may be directional or omnidirectional, together with its associated electronics.

Each base station serves the mobiles located in a certain geographical area referred to as a cell.

The expressions "user station" or "user equipment" or "mobile", or even "user", designate any unit capable of wireless communication and possibly capable of being used in a mobile manner.

In the example illustrated in FIG. 1a, base station u serves mobiles $m_{u1}$, $m_{u2}$ and $m_{u3}$ located in cell $C_u$, and base station v serves mobiles $m_{v1}$, $m_{v2}$, $m_{v3}$ and $m_{v4}$ located in cell $C_v$. The notation $m_x$ will be used hereinafter to designate a mobile served by a base station x. Also, in FIG. 1a, the cells are represented by rectangles by way of example, but can be any other shape. The cells can have an intersection referred to as the "handover" zone.

At each instant, a mobile is characterised by a geographical position, a certain service required and a serving base station, e.g. u or v. These characteristics constitute a configuration of mobiles.

Figure 1B:
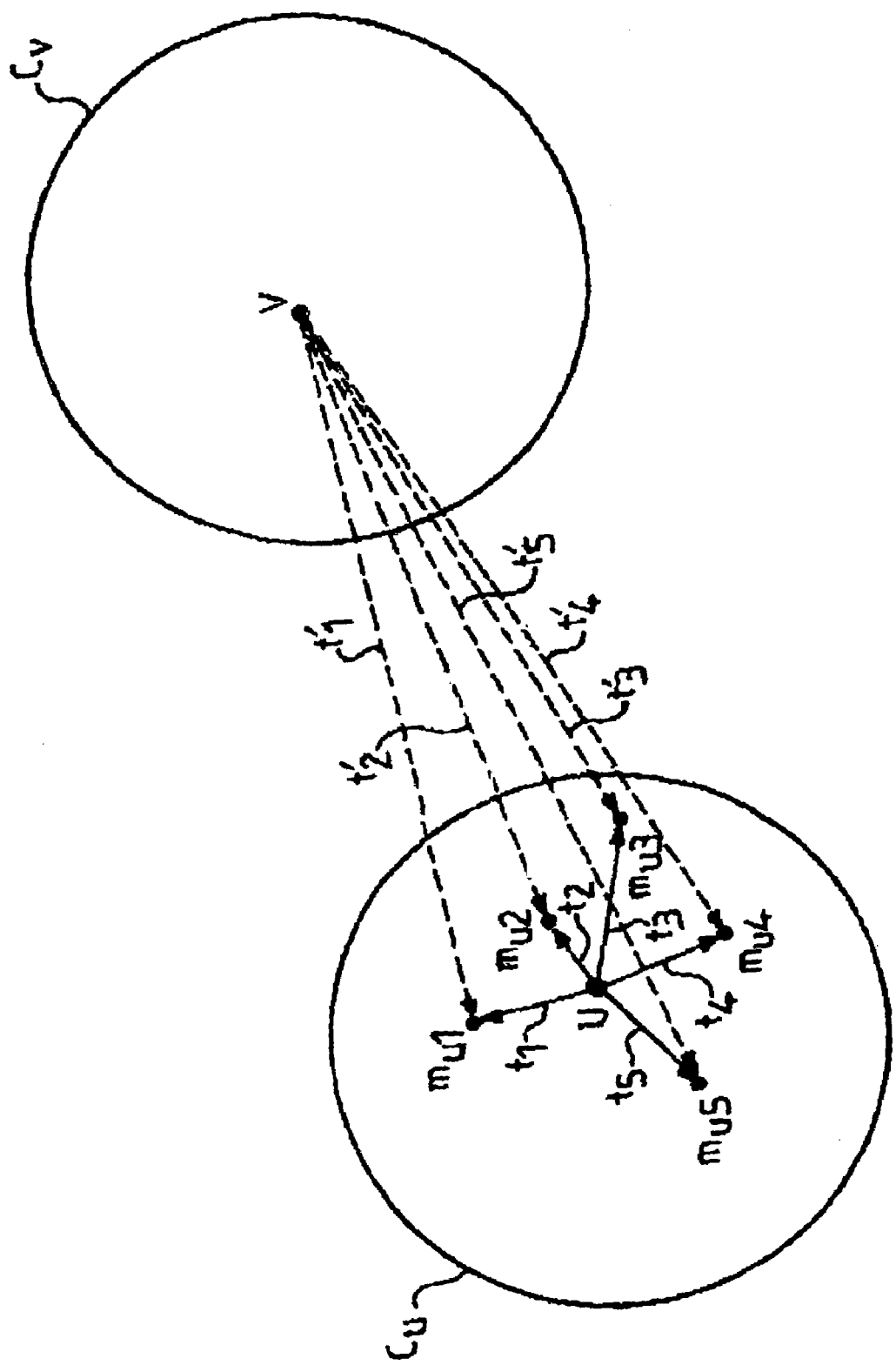

FIG. 1b illustrates an example of a configuration of mobiles served by a base station u. The base station u in cell Cu establishes communication with mobiles $m_{u1}$, $m_{u2}$, $m_{u3}$ and $m_{u4}$ which it serves. These paths from the server station u to the served mobiles are designated by t1, t2, t3, t4 and t5 in FIG. 1b. The paths from the nearby station v to the mobiles served by base station u are designated by t'1, t'2, t'3. t'4 and t'5 in FIG. 1b.

Load control relies partly on the propagation losses along these pathways, referred to as attenuations.

A station is said to be "serving" a mobile if it is providing a service to this mobile. In the following description, the expression "server station" will also be used to designate a station for which admission control of a mobile is exercised.

A station is said to be "nearby" in relation to a mobile if the mobile is able to measure its attenuation vis-a-vis this station.

Figure 1C:
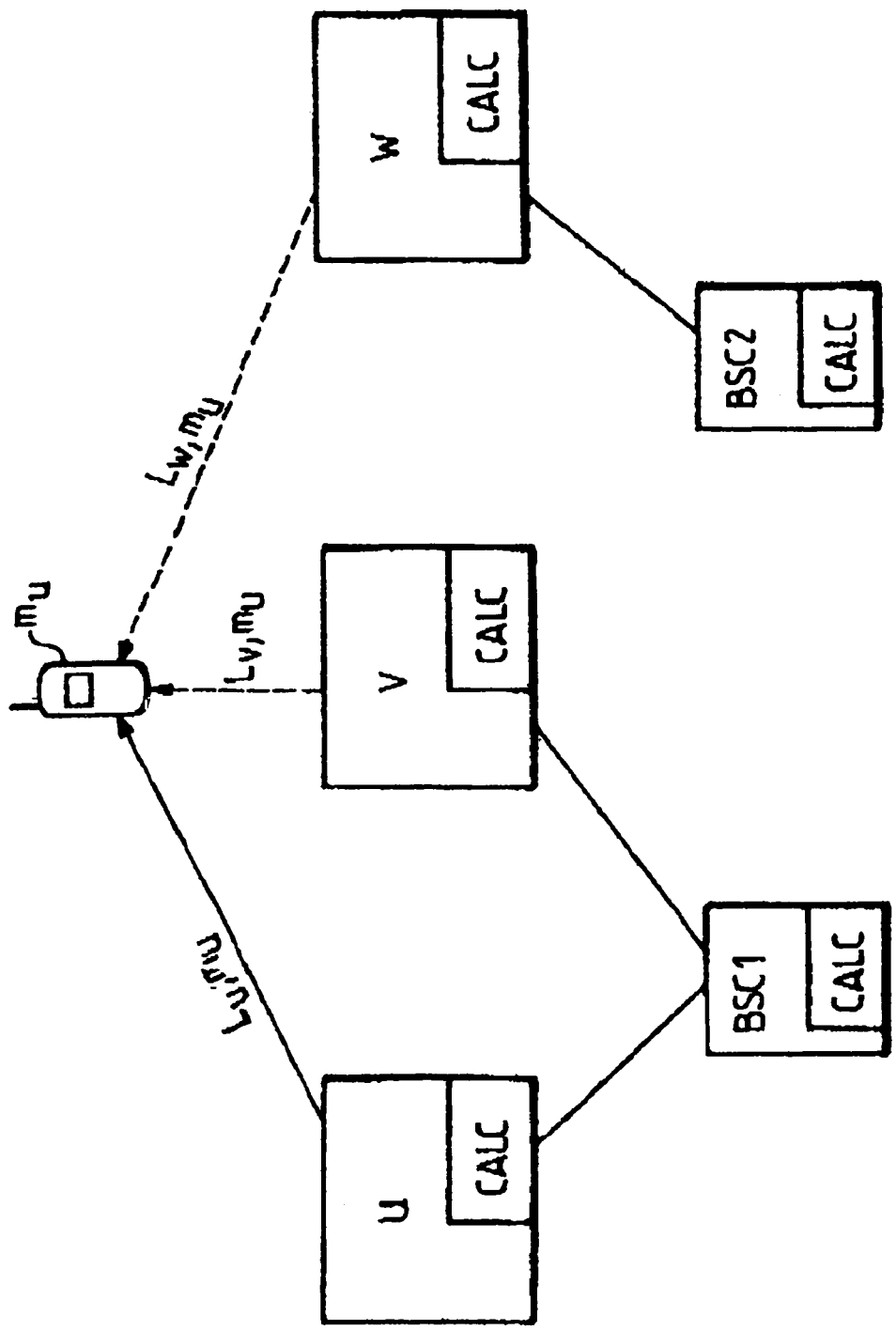
FIG. 1c is a diagram illustrating the layout of a wireless communication network.

FIG. 1c illustrates a communications network including three base stations u, v and w. A mobile $m_u$ is served by the base station u. Attenuations $L_{v,mu}$ and $L_{w,mu}$ exist between each nearby station v, w and the mobile $m_u$, and attenuations $L_{u,mu}$ between the server station u and mobile $m_u$. The mobile $m_u$ reports the attenuation values $L_{v,mu}$ and $L_{w,mu}$ to its server station u.

The base stations u, v and w can be equipped with a calculator CALC for the implementation of load control. As a variant, when they do not have sufficient capacity to be equipped with such a calculator, load control is effected by a base station controller BSC1 or BSC2.

Each base station is in fact connected to a base station controller, which can be common to several stations. For example, base stations u and v are connected to base station controller BSC1 and base station w is connected to base station controller BSC2.

A base station controller is generally responsible for all of the functions associated with radio transmission, such as maintenance of communication when the mobile moves from one cell to another referred to as "handover", management of network resources and data relating to cell configuration.

Wireless communications networks include a transmission layer between network and customer controlled by a protocol, for example the CDMA (Code Division Multiple Access) protocol. This protocol in particular enables each mobile to use the same bandwidth. For a given mobile $m_u$ in a given cell $C_u$, this CDMA protocol uses orthogonal or pseudo-orthogonal codes to filter the signal intended for it from the superimposed signals emitted by the base stations.

The signals emitted by the base stations are attenuated so as to form a noise for the mobile mu, such that the threshold of the ratio of the signal emitted by the server base station u to the noise is greater than a threshold $\xi m_u$ which represents the threshold of the signal-to-interference-and-noise ratio necessary for reception by the mobile $m_u$ of the signal emitted by the station u. This threshold is defined as a function of the bit rate (in bits per second) that the mobile requires.

In order to establish downlink communication between the base station u and a mobile mu, the total power $P_{u,mu}$ of the signal dedicated to a mobile $m_u$ by a base station u must be sufficient to cover the noise of the communications with other mobiles and to be capable of being received by the mobile $m_u$ in question. This constraint corresponds to a problem of power allocation on the downlink. There are situations in which power allocation is not feasible.

Load control aims to ensure the feasibility of power allocation.

The scheme described in the document "*Performance of optimum transmitter power control in cellular radio systems*, IEEE Trans. Veh. Technol., 41:57-62,1992" by J. Zander, provides an overall criterion which ensures the feasibility of power allocation based on the spectral radius of a matrix. However, this scheme is not decentralised in the sense that each base station is not capable of applying the power allocation feasibility criterion independently of the mobiles of the other base stations.

French patent application No. 03 02 017 proposes a process and a scheme that can be used to verify whether or not the power control problem is feasible, without trying to solve it, and in a decentralised manner.

French patent application No. 03 02 017 relies on a comparison between a load indicator and a load threshold, the load indicator taking into account the attenuations between the mobiles and the base stations, and the signal-to-noise-and-interference thresholds (SNIR). As indicated above, the process and scheme described in French patent application No. 03 02 017 do not take account of power limitations. The power allocation feasibility criterion defined in French patent application No. 03 02 017 is based on the verification of SINR thresholds only. It is therefore not suited to environments where the power emitted by each base station is limited by a standard.

The descriptive content of patent application No. 03 02 017 is to be regarded as incorporated by reference to the present description, to which it may be appended as necessary together with its own drawings and annexes.

The invention proposes a decentralised power allocation feasibility criterion designed to take into account the power limits of the base stations and the common channel power, together with a load control scheme based on this criterion.

Although some of its aspects may also apply in the uplink direction (in particular as described in another patent application filed on the same day), the present description refers principally to the downlink direction.

Figure 1D:
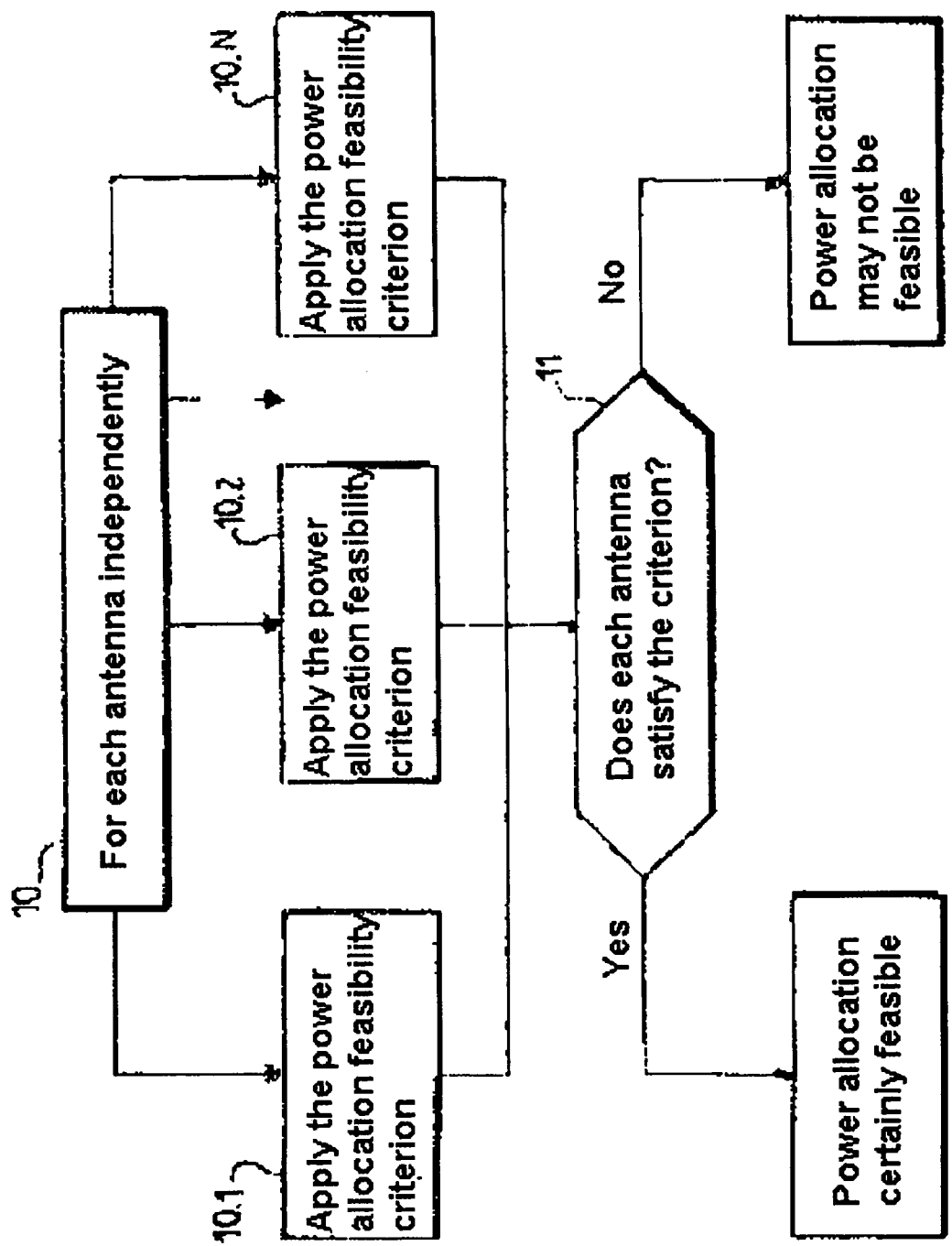
FIG. 1d illustrates the feasibility of power control.

FIG. 1d is a flow diagram representing the decentralised power allocation feasibility criterion. At step 10, the load controller performs the operations 10.1 to 10.N in parallel to individually check whether each base station u1 to uN meets the power allocation feasibility criterion (operation 11). If all the base stations satisfy the criterion, power allocation is certainly feasible and if at least one base station does not satisfy the criterion, power allocation may not be feasible.

In the prior art, the problem of power allocation feasibility is represented by inequality. A in part 1.211 of Annex 1. This inequality reflects the fact that the ratio of the attenuated signals to a set of interferences—represented by the right hand term of inequality A—must be higher than a given threshold representing the signal-to-interference-and-noise threshold $\xi m_u$.

The set of interferences includes noise external to the network N received by the mobile in question, the noise originating from intra-cellular communications $B_{int}$ and the noise originating from extra-cellular communications $B_{ext}$. The noise originating from intra or extra cellular communications is defined as a function of the total power of the base stations.

The formulae providing $B_{int}$ and $B_{ext}$ are given respectively by equations 1.212 and 1.213.

Power allocation in the downlink direction is therefore feasible if non-negative powers $P_{u,mu}$ exist for all of the base stations u serving mobiles $\{m_u\}$ which satisfy the condition represented by inequality A.

In an environment where a power limitation is imposed for each base station, power allocation for the downlink direction is feasible if the condition represented by inequality B in part 1.211 of Annex 1 is also satisfied. This additional condition reflects the fact that the total power Pv of each nearby station v must not exceed its power limit $P_{lim}(V)$.

The applicant found that the two conditions represented by inequality A and B are simultaneously satisfied if the condition represented by inequality 1.221 is satisfied. Equations 1.222 and 1.23 give the different terms of this inequality.

The left hand term of the inequality represents the load indicator Ich(u) of a base station u and the right hand term represents the load threshold.

This inequality defines a power allocation feasibility criterion. Thus, when the criterion is satisfied, power allocation may be feasible. A search for these powers, for example by iteration, will then prove successful.

Figure 2A:
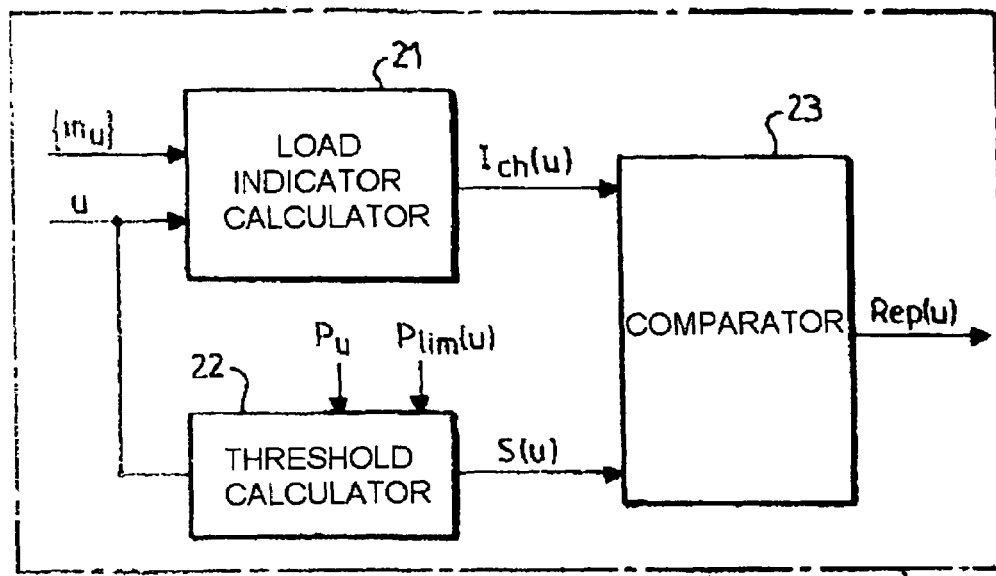
FIGS. 2a to 2c are functional diagrams of the load control scheme according to the invention.
Figure 2B:
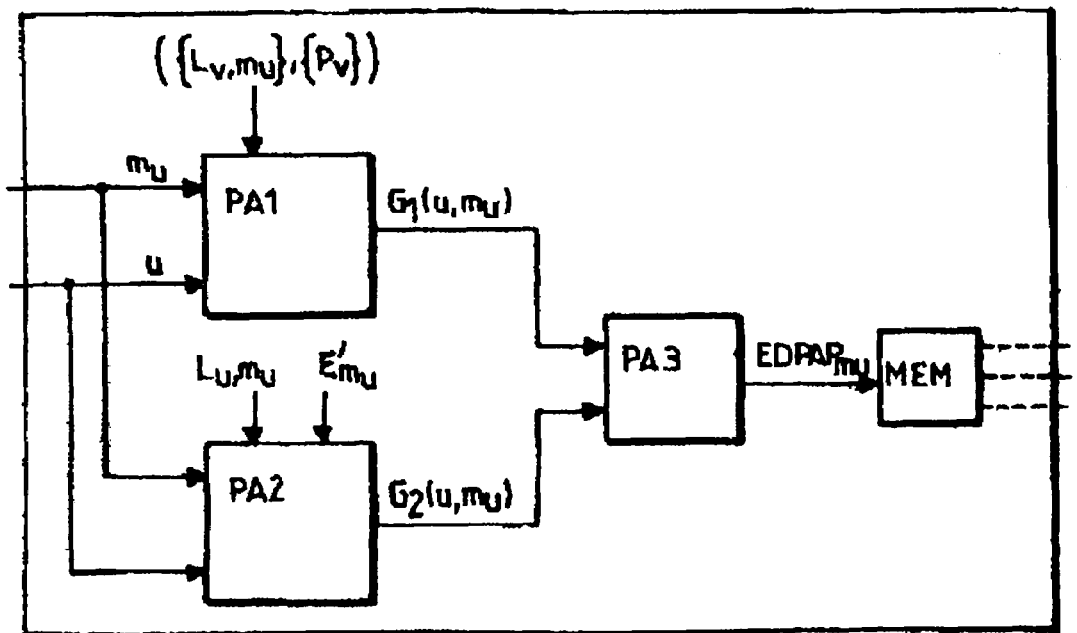
Figure 2C:
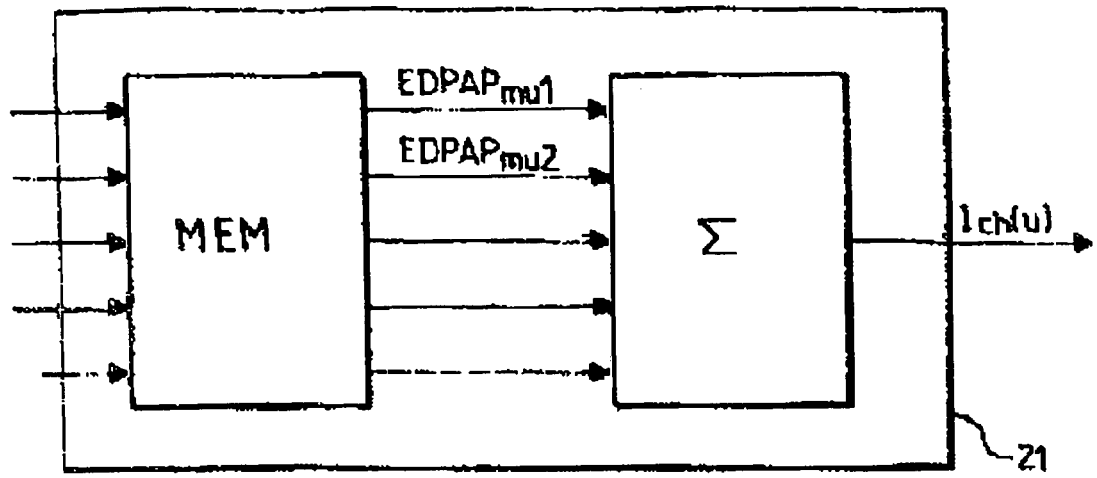

FIGS. 2a to 2c are functional diagrams illustrating a load control scheme according to the invention. The load control scheme according to the invention, designated hereinafter "load controller", can be included in the network base station calculator, for example "Node-B" in UMTS. As a variant, when the base station cannot be equipped with such a calculator, the load control scheme is included in the calculator of the network base station controller, for example "RNC" in UMTS.

In reference to FIG. 2a, the load controller 20 includes a load indicator calculator 21 designed to compute a load indicator Ich(u) for a given base station u serving a predefined set of mobiles $\{m_u\}$. The load controller also includes a threshold calculator 22 designed to compute a load threshold S(u) for the antenna u, from the total power limit $P_{lim}(u)$ of the base station u and the common channel power Pu' of the base station. The power limit $P_{lim}(u)$ of a base station u here denotes the limit on total power emitted by the base station u possibly reduced by a safety margin. The power limit $P_{lim}(u)$ of the base station u and the common channel power Pu' of the base station can take into account the antenna gain G.

The load controller also includes a comparator 23 able to compare the load indicator Ich(u) of the antenna u to the threshold S(u) and of providing a response Rep(u) from which the load controller is able to modify certain parameters of the configuration of mobiles.

The load controller can include a load reduction function designed to reduce the number of mobiles asking to be served by a given station according to the result Rep (u) returned by the comparator.

The load controller can also include an access controller designed to control the admission of a mobile. Thus, the access controller is capable of authorising access to a given server station u for a "candidate" or "incoming" mobile in relation to the result Rep(u) returned by the comparator, as shown in the flow diagram in FIG. 4.

The load controller can also include a load regulator designed to exercise congestion control. The load regulator is capable of modifying the bit rate of the mobiles as a function of the result Rep(u) returned by the comparator, as shown in the flow diagram in FIG. 5.

FIGS. 2b and 2c are functional diagrams illustrating the structure of the load indicator calculator 21 in FIG. 2a.

The load indicator calculator 21 according to the invention includes an elementary load calculator designed to compute the elementary load $EDPAP_{mu}$ induced by a mobile on a given server station.

In reference to FIG. 2b, the elementary load calculator includes a first function PA1 to compute a first elementary quantity $G1(u,m_u)$ for each mobile $m_u$ served by the base station u. This first elementary quantity takes into account the attenuation $Lv,m_u$ of the mobile vis-a-vis each nearby base station v, and the power limit $P_{lim}(v)$ of each of these nearby antennas. Each mobile mu reports to its server u the measured attenuations $Lv,m_u$ vis-a-vis the nearby stations v.

The elementary load calculator according to the invention also includes a second function PA2 to compute a second elementary quantity $G2(u,m_u)$ for the mobile mu served by the base station u. This second elementary quantity takes into account the attenuation $Lu,m_u$ between the mobile $m_u$ and its server station u, and the requirements of the mobile $\xi'm_u$ vis-a-vis the server station u.

The elementary load calculator according to the invention includes a third function PA3 designed to obtain the product of the first elementary quantity $G1(u,m_u)$ by the second elementary quantity $G2(u,m_u)$ for the mobile mu served by the station u.

The load indicator calculator 21 is designed to compute the respective elementary products for a predefined set of mobiles $\{m_u\}$ associated with a given server station u, which provides a set of elementary products $\{EDPAP_{mu}\}$. Each elementary product $EDPAP_{mu}$ thus represents the load induced by a mobile $m_u$ on the base station u.

The loads $EDPAP_{mu}$ for the base station u can be stored in a memory MEM as they are computed.

Referring now to the diagram in FIG. 2c which is supplementary to the diagram in FIG. 2b. The memory MEM is shown in a state such that all of the elementary loads $EDPAP_{mu1}$, $EDPAP_{mu2}$, etc. of the mobiles served by the base station u have been computed and stored. The load indicator calculator 21 includes a summation function $\Sigma$ designed to summate the various additional loads stored in the memory MEM, which gives the load indicator Ich(u).

Figure 2D:
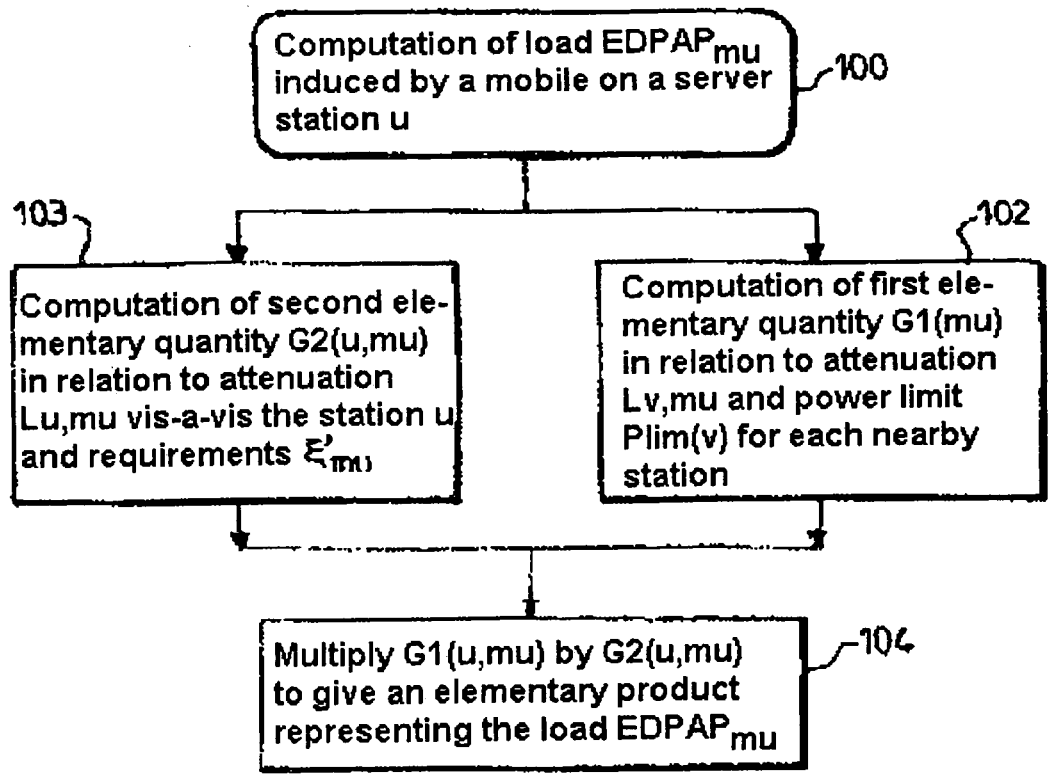
FIG. 2d is a block diagram illustrating the computation steps for the elementary load induced by a mobile on a base station.

FIG. 2d is a flow diagram illustrating the computation steps to determine the elementary load $EDPAP_{mu}$ induced by a mobile $m_u$ on an antenna u.

At step 100, the load controller receives a mobile $m_u$ and a server station u to compute the elementary load $EDPAP_{mu}$ induced by this mobile on the station u.

At step 102, the load controller computes a first elementary quantity $G1(u,m_u)$ taking into account the attenuation $Lv,m_u$ between the mobile mu and each nearby station v and the limit power Pv of each of these nearby stations v.

More precisely, the computation of $G1(u,m_u)$ includes the following elementary calculations for a given nearby station v, according to equation 1.222 in Annex 1:

division of the limit on total power emitted by said nearby station $P_{lim}(v)$ by the attenuation of the mobile vis-a-vis the nearby station $Lv,m_u$;

multiplication of the value obtained by the orthogonality factor $\alpha_{uv}$ between the server station and said nearby station v, which gives an intermediate quantity $g1(u, m_u, v)$, in accordance with equation 1.223.

This elementary calculation is performed for each nearby station. The values $g1(u,m_u,v)$ obtained for the various nearby stations v are then summated, which gives a value $G'1(u,m_u)$. The noise external to the network N transmitted to the mobile mu by the station u is then added to the value $G'1(u,m_u)$, which gives said first elementary quantity $G1(u, m_u)$ for the mobile $m_u$ in accordance with equation 1.222.

At step 103, the load controller then computes the second elementary quantity $G2(u,mu)$ from the attenuation $Lu,m_u$ between the mobile mu and the server station u and the user's requirements represented by the modified signal-to-noise-and-interference ratio threshold $\xi'm_u$. The modified signal-to-noise-and-interference ratio (SNIR) threshold $\xi'm_u$ depends on the signal-to-noise-and-interference ratio threshold $\xi m_u$ and the orthogonality factor $\alpha$ of the station u.

More precisely, the computation of $G2(u,m_u)$ includes the SNIR multiplication modified by the attenuation $Lu,m_u$ between the mobile mu and the server station u, in accordance with equation 1.224 in Annex 1.

At step 104, the load calculator then multiplies the first elementary quantity $G1(u,m_u)$ by the second elementary quantity $G2(u,m_u)$, which gives an elementary product associated with the mobile mu. This elementary product represents the elementary load $EDPAP_{mu}$ induced by the mobile $m_u$ on the base station u.

Figure 3:
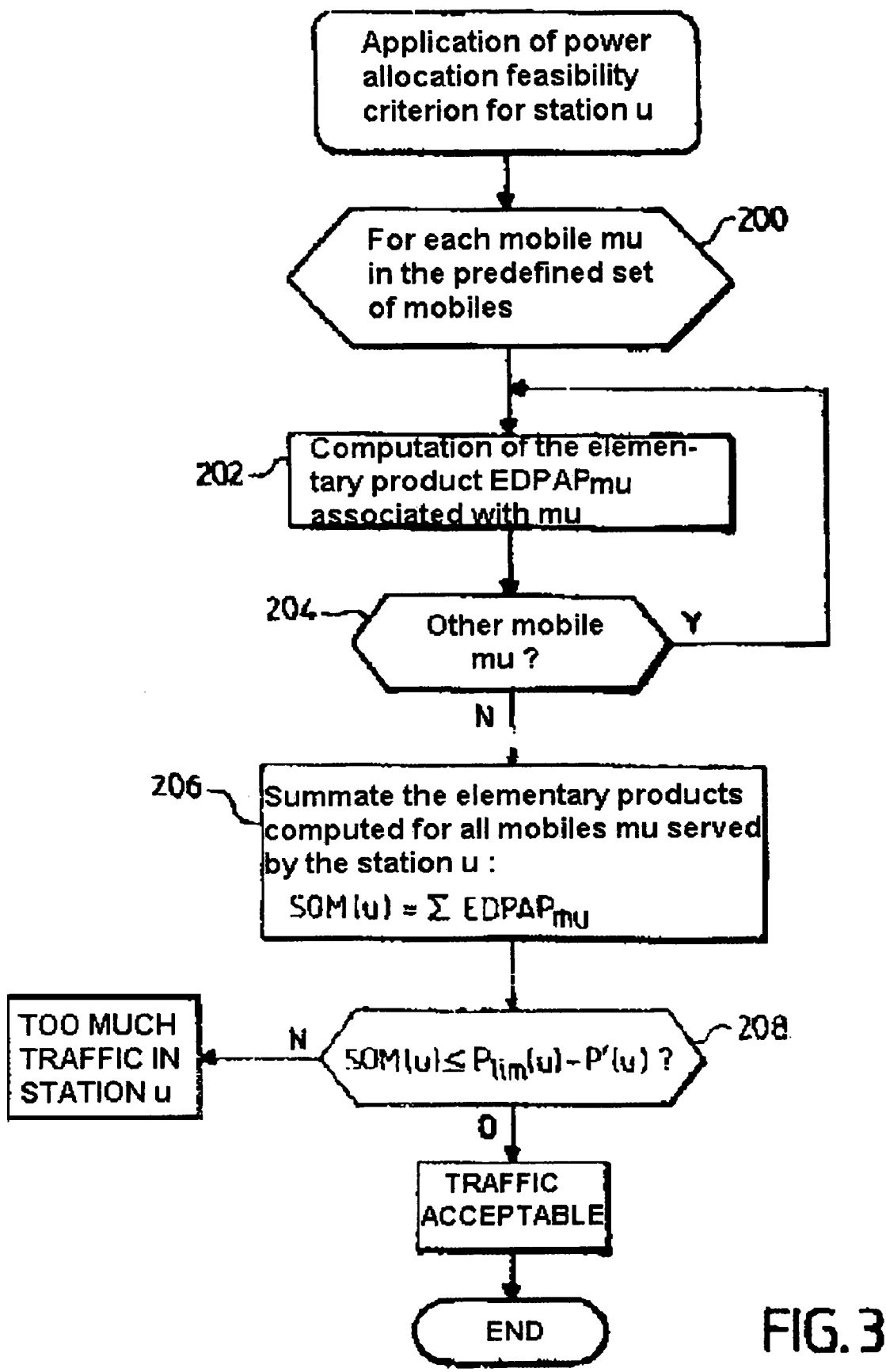
FIG. 3 is a block diagram illustrating the steps in decentralised power allocation in a cell of the network according to the invention.

FIG. 3 is a flow diagram illustrating the operations performed by the load controller to control the traffic of a base station u using the power allocation feasibility criterion according to the invention.

At step 200, the load controller selects a mobile $m_u$ from a predefined set of mobiles including the mobiles served by the station u.

The load controller performs operation 202 to compute the elementary product $EDPAP_{mu}$ representing the elementary load induced by the mobile $m_u$ on the base station u. Computation of the load $EDPAP_{mu}$ is detailed in FIG. 2d.

If test 204 indicates that all of the mobiles served by the station u have not been processed, the load controller repeats operations 202 to 204 for another mobile $m_u$ served by the base station u.

The load controller then summates all of the loads $EDPAP_{mu}$ computed for a predefined set of mobiles. The set of mobiles includes the various mobiles $m_u$ served by the base station u, at step 206.

At step 208, the sum SOM(u) computed at step 206 is compared to the threshold S(u) representing the difference between the limit power $P_{lim}(u)$ of the base station u and the common channel power P'(u) of the base station u.

The sum SOM(u) represents the load indicator Ich(u) of the station u. If the sum SOM(u) is below or equal to the threshold S(u), the signal traffic for station u is acceptable. If not, the base station u has too much traffic.

Traffic can be used to characterise the overload status of the base station u.

Overloading of a station u can include:

too many fixed data rate mobiles for the station, in which case step 208 in FIG. 3 is not verified for this station, and/or congested status detected for the station u, in which case step 208 in FIG. 3 is not verified for this station following computation of the signal-to-noise-and-interference ratio thresholds as a function of the bit rates requested by each mobile on the station. When congestion control is applied, the signal-to-noise-and-interference ratio thresholds can then be computed to avoid this congested state.

The process described in FIG. 3 is used to detect overload status for a predefined set of mobiles served by a base station u. The load controller can apply this process to exercise admission and/or congestion control.

In an embodiment of the invention, wherein the mobiles in the predefined set of mobiles have a fixed data rate demand, the decentralised power allocation process in FIG. 3 is used to implement overall admission control.

Overall admission control aims to reduce the population of mobiles served by a given station so that condition 1.23 is satisfied, and so that power control on the downlink is thus feasible.

According to this embodiment, the load controller initially assesses whether a predefined set of mobiles for a base station u satisfies the inequality at step 208 in FIG. 3. In this embodiment, the predefined set of mobiles includes the population of mobiles asking to be served by the station u. When the population of mobiles $\{m_u\}$ on the base station u does not satisfy this inequality, an overload condition is detected on the station u.

In this case, the load controller can correct this overload by reducing the population of mobiles $\{m_u\}$ on the station u so that the inequality at step 208 is satisfied.

More precisely, the load controller is capable of determining for the station u in question a subset of mobiles $E(\{m_u\})$ contained in the predefined set of mobiles $\{m_u\}$ such that for this subset of mobiles the power control problem for station j on the downlink is feasible, i.e. such that the inequality at step 208 is satisfied.

According to a particular embodiment, the station u can compute the subset $E(\{m_u\})$ independently of the other stations. More precisely, upon detection of an overload at step 208 in FIG. 3 for a given population of mobiles $\{mu\}$ having a fixed bit rate demand vis-à-vis a station u, the population of mobiles on the station is reduced to $E(\{m_u\})$ and the decentralised power allocation feasibility criterion in FIG. 3 is repeated for the station u and for the new population of mobiles $E(\{m_u\})$ until a population of mobiles $E'(\{m_u\})$ which satisfies the inequality at step 208 is found.

The population of mobiles $E'(\{m_u\})$ is then correctly served by the station u and the traffic is acceptable.

According to this particular embodiment, the summation of loads at step 206 can be effected step by step and in a predetermined order, in which case the comparison at step 208 is performed for each intermediate sum. The summation step 206 then includes the following steps:

1) in the predetermined order, selection of an elementary load $EDPAP_{mu}$ associated with a given mobile, 2) addition of the elementary load $EDPAP_{mu}$ to an initial value, which gives a running sum $SOM_{cour}(u)$, 3) verification of the condition at step 208 for a value $SOM(u)$ equal to $SOM_{cour}(u)$.

If the condition is not satisfied at step 3), the summation is interrupted and the mobiles for which the elementary load was previously summated at step 2) are included in the population of mobiles $E'(\{m_u\})$ accepted by the station u. However, the mobile $m_u$ and the other mobiles are not authorised to access the station.

If condition 3) is satisfied and if all of the mobiles have not been processed, steps 1) to 3) are repeated with an initial value equal to $SOM_{cour}(u)$.

At the first iteration of steps 1) to 3), the initial value is null.

The order in which the elementary loads of the mobiles are summated can be for example:

ascending order of the elementary load values, termed ascending order, or random order, and an order derived from a predefined priority between the mobiles.

Ascending order makes it possible to obtain a maximum population of mobiles served by the station, but does not allow mobiles remote from the station to be in communication with the latter.

Random order allows mobiles further away from the station to be associated with it.

This order is conducive to robustness and mobility.

Once overall admission control has been established for a station u, the traffic status is acceptable for the station u.

In addition, new "candidate" or "incoming" mobiles can request access to the station u.

The load controller can then exercise individual admission control or access control.

Figure 4:
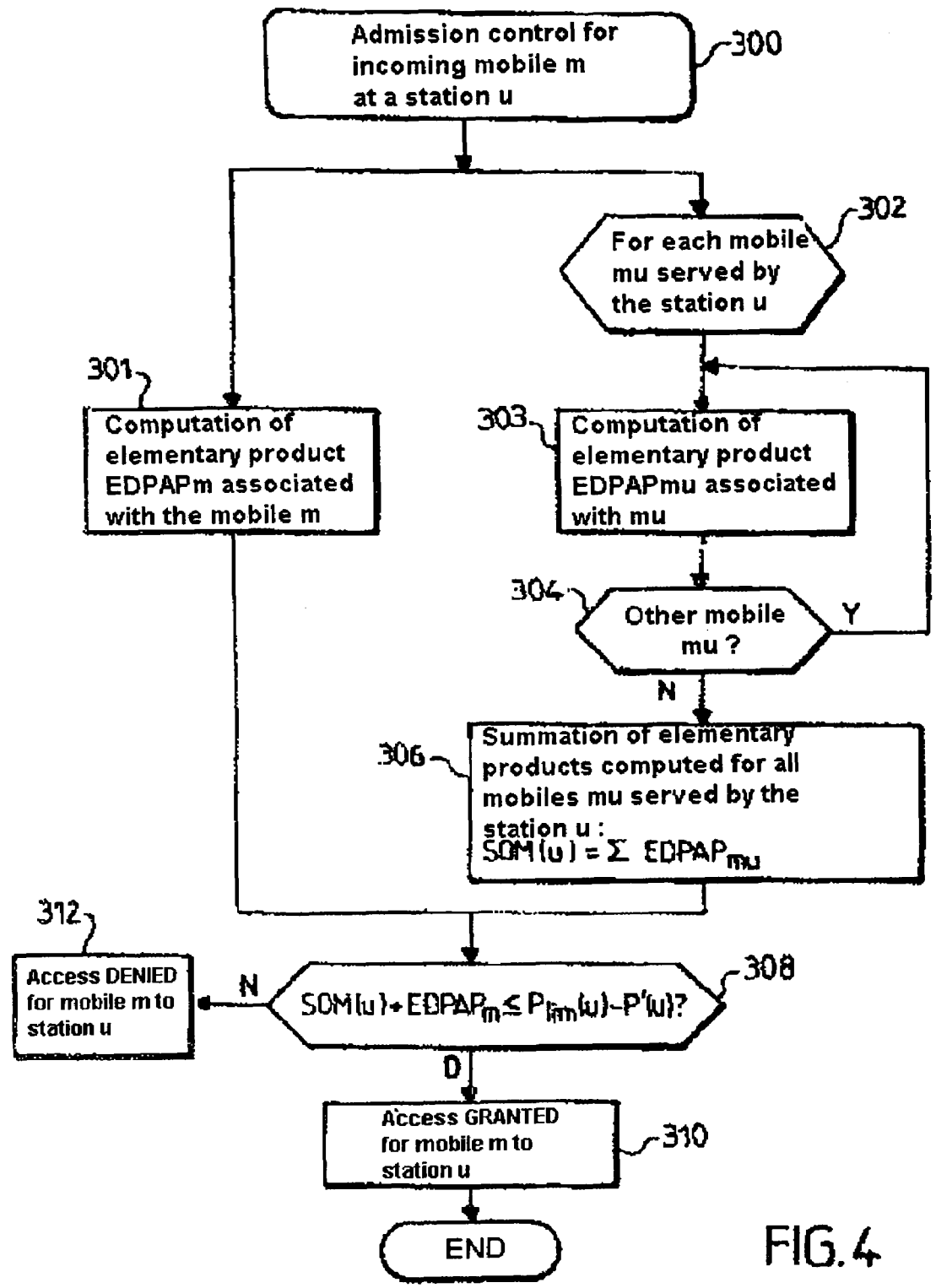
FIG. 4 is a block diagram illustrating the steps in admission control for a new mobile to a base station according to the invention.

This additional embodiment is illustrated by the flow diagram in FIG. 4.

At step 300, a new "incoming" mobile m requests admission to a station u. At step 301, the additional load $EDPAP_m$ induced by the mobile m on the station u is computed in accordance with the flow diagram in FIG. 2d.

In parallel, the load controller computes the elementary load $EDPAP_{mu}$ induced by each mobile mu served by the station u at steps 302 to 304 and then performs a summation of these elementary loads $EDPAP_{mu}$ at step 306, which gives the sum $SOM(u)$ representing the running load indicator $Ich(u)$ of the station u. The running load indicator $Ich(u)$ for the station u represents the load induced on the station u by the active mobiles.

Steps 300 to 304 are equivalent to steps 200 to 206 in FIG. 3 applied to a predefined set of mobiles including the active mobiles and the incoming mobile.

As a variant, the running load indicator $Ich(u)$ may have been initially stored in memory, for example at an iteration of step 206 in FIG. 3 for the active mobiles, during the overall admission control.

The running load indicator $Ich(u)$ for the station u represents the load induced on the station u by the active mobiles.

The running load indicator $Ich(u)$ is then added to the additional load of the "incoming" mobile computed at step 301, which gives a new load indicator $Ich'(u)$ for the station u.

The new load indicator $Ich'(u)$ for the station u represents the load that would be induced on the station u if it served a set of mobiles including the active mobiles and the incoming mobile.

At step 308, the load controller determines whether the new load indicator $Ich'(u)$ is below the load threshold $S(u)$ representing the difference between the limit power $P_{lim}(u)$ of the station u and the common channel power $P'(u)$ of the station u.

If the new load indicator $Ich'(u)$ is below the threshold $S(u)$, the base station u can accept the mobile m while maintaining acceptable traffic and access to the station u by the mobile m is subsequently authorised, at step 310. If not, the mobile m is denied access to the station u, at step 312.

A mobile m not accepted by the station u can be re-assigned to another station v for which the additional load $EDAP_{mv}$ induced by the mobile m on the station v is lower or for which the new load indicator $Ich'(v)$ is the lowest of the new load indicators for the various stations.

For example, each base station u can communicate its load indicator to the other base stations in the network in broadcast mode. In this case, step 308 for an "incoming" mobile m can be executed in parallel for all the base stations at a given moment. Among the base stations satisfying step 308, the load controller determines the base station for which the value of the new load indicator $Ich'(u)$ is the lowest. Access to this station is then accepted for the mobile m.

In addition, the process of overload status detection for a station u described in reference to FIG. 3 can be used to implement congestion control to avoid a level of traffic for which power allocation is not feasible, according to a second embodiment of the invention.

Figure 5:
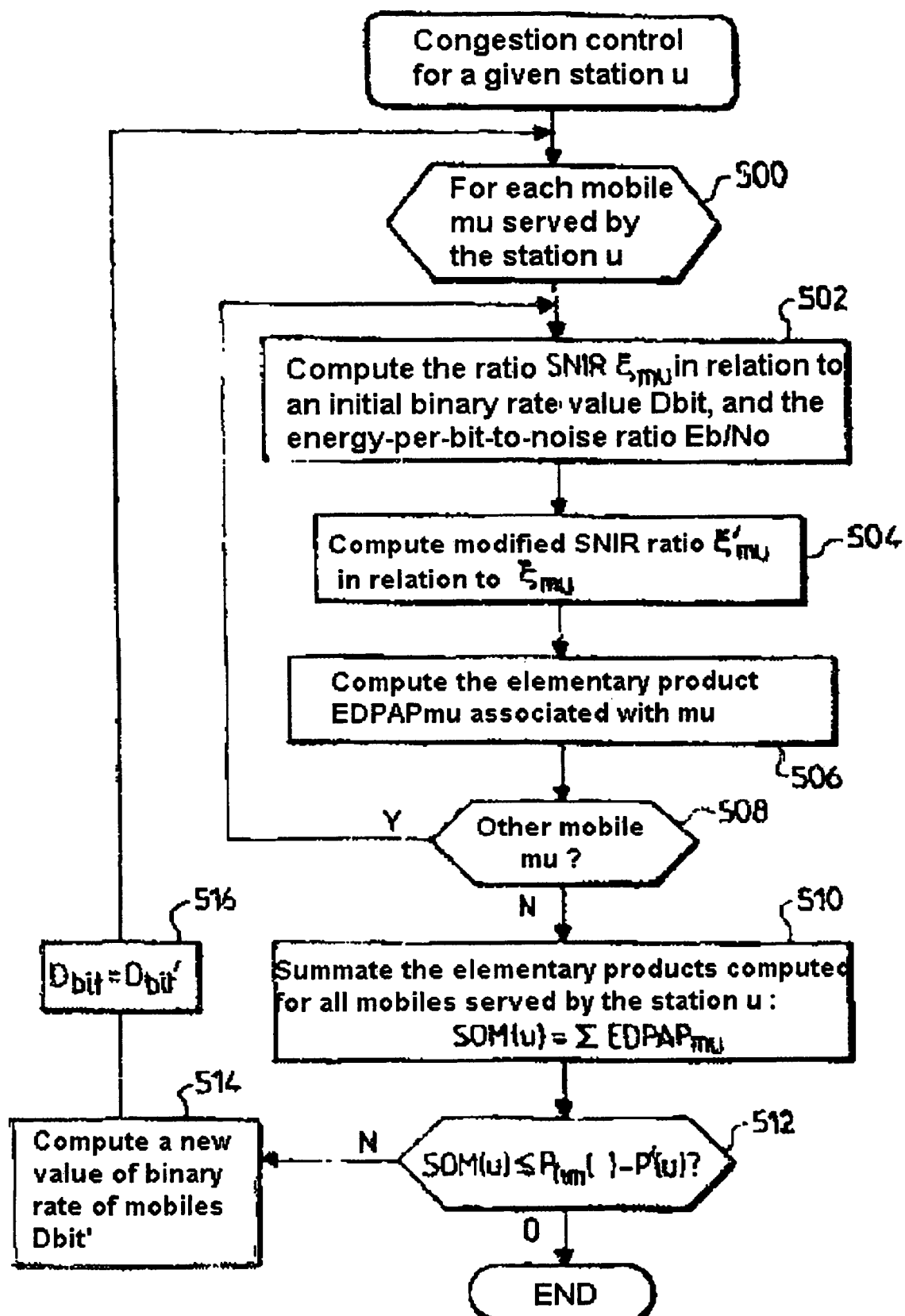
FIG. 5 is a block diagram illustrating the steps in congestion control in a cell of the network according to the invention.

In particular, when the mobiles on a station request the establishment of communication without fixed bandwidth (for data transfer for example) and therefore a variable bit rate, the traffic generated is said to be elastic. Such elastic traffic can engender a state of congestion. FIG. 5 is a flow diagram representing the steps in congestion control according to the second embodiment of the invention.

The process in FIG. 5 can be applied in parallel for each base station in the network.

At step 500, the load controller selects a mobile $m_u$ served by the station u and computes the signal-to-interference-and-noise ratio threshold $\xi m_u$ at step 502 from the bit rate $D_{bit}$, the chip rate $D_{chip}$ and the energy-per-bit-to-noise ratio Eb/No, according to equation 1.25. The chip rate $D_{chip}$ defines a rate in relation to the period of a carrier or subcarrier used for spectrum spreading.

At step 504, the load controller then computes the quantity representing the requirements of the mobile or the signal-to-interference-and-noise ratio threshold $\xi' m_u$ from the signal-to-interference-and-noise ratio threshold $\epsilon m_u$ and orthogonality factor $\alpha$, according to equation 1.24 in Annex 1.

At step 506, the load controller then computes the elementary load $EDPAP_{mu}$ of the mobile $m_u$ for the modified signal-to-interference-and-noise ratio threshold value $\xi' m_u$ computed.

At step 508, the load controller repeats steps 500 to 508 for the other active mobiles on the station u until they have all been processed.

At step 510, the load controller then computes the load indicator $Ich(u)$ (or $SOM(u)$) of the base station u by summating the elementary loads computed at steps 500 to 510.

At step 512, the load controller determines whether this load indicator $Ich(u)$ of the base station u is below or equal to the threshold $S(u)$.

If the load indicator $Ich(u)$ of the base station u is above the threshold $S(u)$, the load controller computes a new bit rate value $D'_{bit}$ less than $D_{bit}$, at step 514, and repeats steps 500 to 512 with a bit rate value $D_{bit}$ equal to $D'_{bit}$, at step 216.

The scheme and process according to the invention thus facilitate decentralised load control capable of handling populations of mobiles served by each base station, independently of the other stations.

The load indicators according to the invention have the advantage of relying only on the attenuations between the mobiles and base stations and the signal-to-interference-and-noise thresholds, at the same time taking into account the base station power limits and the common channel powers in the downlink direction. Consequently, they do not fluctuate.

In the case of UMTS for example, the parameters required to compute the load indicators are available. In particular, it is currently possible to measure the attenuations between a mobile and 32 antennas.

Furthermore, the additional load induced on a base station by a new user is computed with precision in the various embodiments of the invention.

Clearly, other variants of load control based on utilisation of the elementary load induced by a mobile on a station can be envisaged.

The invention has industrial application in the field of wireless telephony and relates to a load control process for a wireless telephony network already installed or planned. The process can also be used in simulation tools for these networks.

Annex 1

1.1—Notations $m_u$: mobile served by a base station u $L_{v,m}$: attenuation between an antenna v and a user m N: external noise $\alpha$: orthogonality factor ($\alpha=0$ when perfectly orthogonal)

$\alpha_{uv}=1$ if $v \neq u$ $\alpha_{uv}=\alpha$ if $v=u$ $\xi m_u$: signal-to-interference-and-noise ratio (SINR) threshold for the user $m_u$ $\xi' m_u$: modified SINR $P'v$: common channel power for a base station v $Pv,m_v$: power of channel dedicated to the mobile $m_v$ Pv: total power emitted by the antenna v when $Pv=P'v=_{m_v}Pv,m_v$ $P_{lim}(v)$: limit on total power emitted by the antenna v.

1.2—Equations 1.21—Power Allocation Feasibility Conditions (1.211)

$$A) \quad \frac{P_{u,mu} / L_{u,mu}}{N + B_{int} + B_{ext}} \leq \xi_{mu} \forall u,$$

$$B) P_v \leq P_{lim}(v) \forall v$$

$$B_{int} = \alpha(P_u - P_{u,mu})/L_{u,mu} \quad (1.212)$$

(1.213)

$$B_{ext} = \sum_{v \neq u} P_v / L_{v,mu}$$

1.22—Power Allocation Feasibility Criteria (1.221)

$$\sum_{m_u} G1(u, m_u) G2(u, m_u) \leq S(u)$$

(1.222)

$$G1(u, m_u) = \sum_v g1(u, m_u v) + N$$

$$g1(u, m_u, v) = \alpha_{uv} \cdot P_{lim}(v) / L_{v,mu} \quad (1.223)$$

$$G2(u, m_u) = \xi' m_u \cdot L_{u,mu} \quad (1.224)$$

1.23—Load Threshold $$S(u) = P_{lim}(u) - P'(u)$$

1.24—SINR Threshold $$\xi_{mu} = \frac{D_{bit}}{D_{chip}} * \frac{Eb}{N_0}$$

1.25—Modified SINR Threshold $$\xi'_{mu} = \frac{\xi_{mu}}{1 + \alpha \xi_{mu}}$$

What is claimed is:

1. A control method for a wireless communications network, said network being composed of a plurality of stations communicating with a plurality of mobiles in downlink mode, wherein said control method includes for a given station:
   i) for a mobile served by the given station,
      i1) computing a first elementary quantity taking into account an attenuation ($L_{v,mu}$) between each of a set of neighboring stations for the mobile, and a limit of total power emitted by each neighboring station for the mobile ($P_{lim}(v)$);
      i2) computing an elementary product by multiplying the first elementary quantity by a second elementary quantity, wherein the second elementary quantity takes into account a communication requirement of the mobile vis-à-vis a server station of the set of neighboring stations ($\xi mu'$) and an attenuation between the server station and the mobile ($L_{u,mu}$), which gives an elementary product; and
   ii) controlling a link between said server station and one or more mobiles served by the given station based on a load indicator derived from the elementary products related to each of the plurality of mobiles.

2. A method according to claim 1, wherein it additionally includes for a predefined set of the plurality of mobiles served by a given station (u), the method further comprises:
   a) applying step i) to each mobile in the predefined set, which gives elementary products;
   b) calculating a summation of the elementary products obtained at step a); and
   c) comparing the load indicator derived from the summation made in step b) to a load threshold relative to the limit of total power emitted by the server station ($P_{lim}(u)$) to perform the control of step ii).

3. A method according to claim 2, wherein step c) includes computing a difference between the limit of total power emitted by the server station and a common channel power of the server station, which gives said load threshold.

4. A method according to claim 2, wherein the load indicator is equal to the summation at step b).

5. A method according to claim 4, wherein the mobiles have a fixed data rate demand and if the comparing of step c) indicates that the load indicator is greater than the load threshold, the method further comprises:
   d) removing mobiles from the predefined set of mobiles to create a reduced set of predefined mobiles; and
   e) iterating steps a) to c) for the reduced set obtained at step d).

6. A method according to claim 4, wherein the mobiles have a variable rate demand, and step i1) is further comprised of:
   i'11) computing a signal-to-interference-and-noise ratio threshold ($\xi m_u$) as a function of an initial bit rate value;
   i'12) computing the communication requirement ($\xi m_u'$) of the mobile vis-à-vis the server station as a function of the signal-to-interference-and-noise ratio threshold ($\xi m_u$) obtained at step i'11); and
   modifying the initial bit rate value and iterating steps a) to c) for the new initial rate value if the comparison at step c) indicates that the summation is greater than the load threshold.

7. A method according to claim 2, wherein the mobiles have a fixed data rate demand and the method further comprises controlling access of a new candidate mobile to the server station.

8. A method according to claim 7, wherein step c) further comprises storing a stored value equal to the summation.

9. A method according to claim 8, wherein the step of controlling access is further comprised of:
   j1) iterating step i) for said candidate mobile, which gives an elementary product associated with the candidate mobile;
   j2) adding the elementary product to the stored value; and
   j3) iterating step c) for a load indicator equal to the result of step j2).

10. A method according to claim 8, further comprising authorizing the candidate mobile to access the server station if the comparison at step j3) indicates that the load indicator is below or equal to the load threshold.

11. A method according to claim 8, further comprising denying access to the server station if the comparison at step j3) indicates that the load indicator is above said load threshold.

12. A method according to claim 1, wherein step i1) includes for a given neighboring station for the mobile, the method further comprises:
   i11) calculating a value by division of the limit of total power emitted by the given neighboring station ($P_{lim}$ (v)) by the attenuation between the given neighboring station (v) and the mobile ($L_{v,mu}$); and i12) multiplying the value obtained at step i11) by an orthogonality factor between the server station and said neighboring station.

13. A method according to claim 12, wherein-step i1) includes:
- k1) calculating a set of values by applying steps i11) and i12) to each neighboring station;
- k2) calculating a summation of the values obtained at step k1); and
- k3) adding an external noise to the summation obtained at step k2), which gives said first elementary quantity for said given mobile.

14. A method according to claim 1, wherein step i2) further comprises computing a quantity representing a communication requirement of the mobile vis-à-vis the server station ($\xi_{mu}'$) from a threshold of—a signal-to-interference-and-noise ratio ($\xi m_u'$) and an orthogonality factor between—a set of server station channels ($\alpha$).

15. A method according to claim 14, wherein step i2) further comprises multiplying the communication requirement of the mobile vis-à-vis the station ($\xi m_u'$) by the attenuation between the server station and the mobile ($L_{u,mu}$), which gives the second elementary quantity.

16. A method according to claim 14, wherein the threshold of the signal-to-interference-and-noise ratio ($\xi m_u$) is computed from a bit rate ($D_{bit}$) assigned to the mobile.

17. A control method for a wireless communications network, said network being composed of a plurality of stations communicating in downlink mode with a plurality of mobiles having a fixed data rate, wherein said control method includes for a given station:
- i) for a mobile served by the given station,
  - i1) computing a first elementary quantity taking into account an attenuation ($L_{v,mu}$) between each of a set of neighboring stations for the mobile, and a limit of total power emitted by each neighboring station for the mobile ($P_{lim}(v)$);
  - i2) computing an elementary product by multiplying the first elementary quantity by a second elementary quantity, wherein the second elementary quantity takes into account a communication requirement of the mobile vis-à-vis a server station of the set of neighboring stations ($\xi mu'$) and an attenuation between the server station and the mobile ($L_{u,mu}$), which gives an elementary product;
- ii) controlling a link between said server station and one or more mobiles served by the given station based on a load indicator derived from the elementary products related to each of the plurality of mobiles;

for a predefined set of the plurality of mobiles served by a given station (u),
- a) applying step i) to each mobile in the predefined set, which gives elementary products;
- b) calculating a summation of the elementary products obtained at step a) in a specified order;
- c) comparing the load indicator derived from the summation made in step b) to a load threshold relative to the limit of total power emitted by the server station ($P_{lim}(u)$) to perform the control of step ii);

wherein the plurality of mobiles have a fixed data rate demand and in that the summation of the elementary products at step b) is performed step by step in a specified order and includes for a given initial value:
- b1) adding an elementary product, associated with a given mobile in the predefined set, to said initial value, which gives a current sum; and
- b2) iteration of step c) applied to a load indicator equal to the current sum.

18. A method according to claim 17, wherein step b) is further comprised of iterating steps b1) and b2) for the next elementary product, in the specified order, with the initial value as equal to the current sum obtained at the previous step b1) if the comparison at step b2) indicates that the load indicator is below or equal to the load threshold.

19. A method according to claim 18, wherein step b) is further comprised of interrupting of the summation and denial of the server station access to the mobile associated with the last added elementary product added to the mobiles associated with the following elementary products, in the specified order, if the comparison at step b2) indicates that the load indicator is above the load threshold.

20. A method according to claim 17, wherein the summation of the elementary products is performed in ascending order of the elementary products.

21. A method according to claim 17, wherein the summation of the elementary products is performed in random order of the elementary products.

22. A method according to claim 17, wherein the summation of the elementary products is performed in an order specified as a function of predefined priorities between the associated mobiles.

23. A method according to claim 17, wherein the initial value is null at the first iteration of step b1).

24. A control device for a wireless communications network, including a plurality of stations communicating with a plurality mobiles, in downlink mode, said device incorporating an elementary load calculator capable of computing a load induced by a mobile ($m_u$) on a server station (u), wherein the elementary load calculator includes:
- a first function (PA1) capable of computing a first elementary quantity taking into account a attenuation between each of a set of neighboring stations for the mobile and the mobile ($L_{v,mu}$) and a limit of total power emitted by each neighboring station for the mobile ($P_{lim}(v)$),
- a second function (PA2) capable of computing a second elementary quantity taking into account a communication requirement of the mobile vis-à-vis a server station of the set of neighboring stations ($\xi m_u'$) and a attenuation between the server station and the mobile ($L_{u,mu}$),
- the elementary load calculator being capable of computing the product of the first elementary quantity by the second elementary quantity (PA3), which gives an elementary product representing the load induced by the mobile (EDPAPmu),
- and the device is further configured to control a link between the server station and one or more mobiles served by the given station based on a load indicator derived from the elementary products related to each of the mobiles.

25. A device according to claim 24, wherein the device is further configured to compute respective elementary products for a predefined set of mobiles served by the given station.

26. A device according to claim 25, wherein the device is further comprised of a summation function configured to calculate a summation of the computed elementary products.

27. A device according to claim 26, wherein the device is further comprised of a comparator (23) configured to interact with the summation function, the comparator being configured to compare a load indicator derived from the summation performed by the summation function for the server station with a load threshold related to the limit of total power emitted by the server station ($P_{lim}(u)$)).

28. A device according to claim 26, further comprised of a threshold calculator configured to compute a difference between the limit of total power emitted by the server station ($P_{lim}(u)$) and a common channel power of the server station ($P'(u)$), which gives said load threshold.

29. A device according to claim 26, characterized in that it includes a load reduction function capable of reducing the number of mobiles in the predefined set of mobiles associated with the station, if the comparator indicates that the load indicator is above the load threshold.

30. A device according to claim 26, wherein the mobiles have a fixed data rate demand, and the device is further comprised of an access controller to control access of a candidate mobile to the station depending on the result returned by the comparator.

31. A device according to claim 30, wherein the access controller is configured to authorize the new mobile ($m_u$) to access to the station (u) if the result returned by the comparator indicates that the load indicator is below or equal to the load threshold.

32. A device according to claim 30, wherein the access controller is further configured to deny the new mobile access to the server station if the result returned by the comparator indicates that the load indicator is above the load threshold.

33. A device according to claim 24, characterized in that the first function (PA1) is capable of dividing the limit of total power emitted by a given neighboring station for the mobile ($P_{lim}(v)$) by an attenuation between the given neighboring station and the mobile ($L_{v,mu}$), and of multiplying the value resulting from the division by an orthogonality factor between the server station and said neighboring station ($\alpha_{u,v}$), which gives an intermediate quantity.

34. A device according to claim 33, characterized in that the first function (PA1) is capable of computing—the value of the intermediate quantity for each neighboring station for the mobile, summing the values of the intermediate quantities thus obtained, and adding an external noise (N) to the result of the summation, which gives the first elementary quantity for said mobile.

35. A device according to claim 24, characterized in that the second function (PA2) is capable of computing a quantity representing the requirements, in terms of communication, of the mobile vis-à-vis the server station ($\xi m_u'$) from a threshold of a signal-to-interference-and-noise ratio ($\xi m_u$) and a orthogonality factor between the server station channels ($\alpha$).

36. A device according to claim 35, characterized in that the second function (PA2) is capable of multiplying the quantity representing—the requirements, in terms of communication, of the mobile vis-à-vis its server station ($\xi m_u'$) by the attenuation between the station and the mobile ($L_{u,mu}$), which gives the second elementary quantity.

37. A device according to claim 35, wherein the threshold of the signal-to-interference-and-noise ratio ($\xi m_u$) is computed from a bit rate ($D_{bit}$) assigned to the mobile.

38. A device according to claim 37, wherein the mobiles have a variable rate demand and the device is further comprised of a load regulator, said regulator being configured to modify the bit rate value assigned to the mobiles if the result returned by the comparator indicates that the load indicator is below or equal to the load threshold.

39. A control method for a wireless communications network, said network being composed of a plurality of stations communicating with a plurality of mobiles in downlink mode, characterized in that said control method includes for a given station:

i) for a mobile served by the given station,
- i1) computing a first elementary quantity taking into account an attenuation ($L_{v,mu}$) between each of a set of neighboring stations for the mobile, and a limit of total power emitted by each neighboring station for the mobile ($P_{lim}(v)$);
- i2) computing an elementary product by multiplying the first elementary quantity by a second elementary quantity, wherein the second elementary quantity takes into account a communication requirement of the mobile vis-à-vis a server station of the set of neighboring stations ($\xi mu'$) and an attenuation between the server station and the mobile ($L_{u,mu}$), which gives an elementary product; and ii) controlling a link between said server station and one or more mobiles served by the given station based on a load indicator derived from the elementary products related to each of the plurality of mobiles, characterized in that it additionally includes for a predefined set of the plurality of mobiles served by a given station (u):

a) applying step i) to each mobile in the predefined set, which gives elementary products;

b) calculating a summation of the elementary products obtained at step a); and c) comparing the load indicator derived from the summation made in step b) to a load threshold relative to the limit of total power emitted by the server station ($P_{lim}(u)$) to perform the control of step ii);

wherein the load indicator is equal to the summation at step b), and wherein the mobiles have a variable rate demand, and step i1) is further comprised of:
- i'11) computing a signal-to-interference-and-noise ratio threshold ($\xi m_u$) as a function of an initial bit rate value;
- i'12) computing the communication requirement ($\xi m_u'$) of the mobile vis-à-vis the server station as a function of the signal-to-interference-and-noise ratio threshold ($\xi m_u$) obtained at step i'11); and modifying the initial bit rate value and iterating steps a) to c) for the new initial rate value if the comparison at step c) indicates that the summation is greater than the load threshold.

* * * * *